Patented Oct. 19, 1943

2,332,491

UNITED STATES PATENT OFFICE 2,332,491

CATALYTIC PROCESS FOR NITRATION OF HYDROCARBONS

Murray Senkus, Terre Haute, Ind., assignor to Commercial Solvents Corporation, Terre Haute, Ind., a corporation of Maryland No Drawing. Application May 1, 1940, Serial No. 332,848

6 Claims. (Cl. 260—644)

My invention relates to a process for the nitration of hydrocarbons, and more especially to an improved catalytic process for the liquid phase nitration of saturated aliphatic hydrocarbons.

It has long been known that saturated hydrocarbons could be nitrated in the liquid phase by means of nitric acid. Markownikoff (J. Chem. Soc. 76(1), 553), Konowaloff (J. Chem. Soc. 88, (1) 763), Worstall (Amer. Chem. J. 20, 202; 21, 210) and others have reported the production of nitrohydrocarbons by the action of nitric acid on hydrocarbons in the liquid phase. All of the previous attempts to effect this reaction, however, have been unsatisfactory from a commercial point of view. The reaction at relatively low temperatures is so slow as to preclude commercial operation, and at higher temperatures other competing reactions and decomposition reactions occur, with resulting decreased yields.

I have now discovered that hydrocarbons may be successfully be nitrated in the liquid phase if there is provided as a catalyst a material which reduces nitric acid under the conditions employed in the nitration reaction. By this means the nitration reaction is sufficiently accelerated as to be commercially feasible at temperatures much lower than have previously been useful. Similarly, at higher temperatures the nitration reaction is sufficiently rapid in the presence of the catalyst to decrease the effect of competing reactions and decomposition reactions.

In accordance with my invention, the catalyst may be any material which will reduce nitric acid, under the conditions of the nitration reaction. By this term, of course, is meant a material which will effect more rapid reduction of nitric acid under the nitration reaction conditions than is effected by the hydrocarbon to be nitrated. The catalyst may be a solid, liquid, or gaseous substance, but it will be apparent that gases are less desirable than liquids or solids from the standpoint of ease of introduction into the reaction mixture. A large number of materials, both organic and inorganic in nature, are known to reduce nitric acid readily, and thus are available as catalysts for my process. Among these may be mentioned inorganic nitrites, thiocyanates, and thiosulfates, carbon, phosphorus, sulfur, nitric oxide, aliphatic alcohols, aldehydes, ketones, mercaptans, and even the nitro hydrocarbons which are the products of the nitration reaction. This catalytic activity of the nitro hydrocarbons indicates that the nitration process is autocatalytic, once the nitration reaction has been initiated.

Among the various materials which may be employed as catalysts in my process, I prefer to use those whose reaction products are readily separated from the remainder of the reaction mixture. Thus, sulfur and carbon form gaseous oxides which are easily separated; and the nitro hydrocarbons form no products in addition to those otherwise present in the final reaction mixture. Although I prefer to employ materials such as sulfur, carbon, and the nitroparaffins, any materials of the general class previously described may be satisfactorily employed, and little difficulty will be encountered in separating the reaction products.

An additional advantage of employing the nitro hydrocarbons themselves as catalysts is the fact that in a cyclic process unreacted hydrocarbons, after removal of the bulk of the nitrated hydrocarbons, will normally contain sufficient residual nitrated hydrocarbons to provide the necessary catalyst for the reaction, when recycling such unreacted hydrocarbons.

The concentration of catalyst to be employed in carrying out my process is not critical, and may be varied over a considerable range. Concentrations of sulfur ranging from 0.01 to 0.5 gram atom per mole of nitric acid will generally be satisfactory, and equivalent concentrations of other materials which reduce nitric acid may be employed. A considerable excess of catalyst will not interfere with the reaction, but of course a large excess of a material which reacts with nitric acid will reduce the yields of nitration products based on nitric acid introduced into the process. The minimum amount of catalyst which is required for any particular set of reaction conditions can readily be determined by preliminary experiments.

My process is adapted for the nitration of any saturated hydrocarbons which have critical temperatures sufficiently high to enable the hydrocarbon to be maintained at the reaction temperature in the liquid phase. The paraffins and cycloparaffins are particularly adapted for nitration in this manner, and my process is also suitable for nitration in the side chain if aromatic substituted paraffins are employed.

Any of the prior procedures for the liquid phase nitration of hydrocarbons may be employed in conjunction with my catalysts. Reaction temperatures, nitric acid concentrations, and ratios of reactants otherwise suitable will also be found to be satisfactory in my catalytic process. Generally, however, the provision of a catalyst will enable the process to be effected at a somewhat lower temperature than in the absence of a catalyst, and my process is especially suited for effecting the nitration reaction below 150° C. In most cases, I prefer to carry out the reaction at temperatures from 125° C. to 145° C.

The nitric acid concentration employed may vary over a fairly wide range, e. g. from 10% by weight to 50% by weight. The higher concentrations, however, tend to increase the amount of oxidation occurring simultaneously with nitration, and I generally prefer to employ nitric acid of less than 40% concentration by weight. I have obtained very satisfactory nitrations with nitric acid of approximately 35% concentration.

The ratio of hydrocarbon to nitric acid in the reaction mixture may likewise vary over a considerable range. In general, however, an excess of hydrocarbon is desirable in order to minimize decomposition of the nitro hydrocarbons and I prefer to employ two moles or more hydrocarbon per mole of nitric acid.

Since the hydrocarbon and nitric acid are immiscible, agitation during the reaction is desirable in order to secure adequate contact of the reactants. If the particular reaction mixture boils within the desired temperature range for the reaction, the mixture may be refluxed, thus providing the desired agitation. On the other hand, if a relatively low boiling hydrocarbon is nitrated, the reaction will have to be effected in a sealed vessel under pressure, in which case mechanical agitation should be provided. These and other expedients previously employed for liquid phase reactions may be used in conjunction with my present invention. In general it may be said that my catalytic process is not limited to any particular procedure for effecting the liquid phase nitration.

My invention may be further illustrated by the following specific examples:

*Example I* n-Heptane and nitric acid (35.5% by weight) in a ratio of two moles of heptane per mole of nitric acid were sealed in a reaction vessel together with approximately 0.18 gram atom of sulfur per mole of nitric acid. The reaction mixture was then heated to 135° C. for 10 minutes while agitating. The mixture was then allowed to cool, the two layers were separated, and the oily layer was fractionally distilled to recover nitrated hydrocarbons. Nitric acid present in the aqueous layer was determined by titration. A yield of nitrated hydrocarbons corresponding to approximately 52% of the theoretical yield was obtained. The identical procedure was repeated in the absence of sulfur, in which case no nitrated hydrocarbons were obtained.

*Example II*

The procedure of Example I was followed utilizing the following reactants in the ratio indicated:

Nitric acid (35.5% by weight) _____moles__ 1
2,2,4-trimethylpentane _____do____ 2
Sulfur _____gram atom__ 0.09

The reaction temperature was 140–145° C. The yield of nitrated products was approximately 40% of the theoretical yield. In an identical experiment in the absence of sulfur, no nitrated products were obtained.

*Example III*

The procedure of Example II was followed, substituting cetane for 2,2,4-trimethylpentane. The yield of nitrated hydrocarbons obtained in the presence of sulfur was approximately 45% of the theoretical yield. In an identical experiment in the absence of sulfur, no nitrated products were obtained.

*Example IV*

The procedure of Example I was followed, substituting carbon (decolorizing carbon) for sulfur in a ratio of 0.47 gram atom of carbon per mole of nitric acid. The yield of nitrated products was approximately 52% of the theoretical yield. In an identical experiment in the absence of carbon, no nitrated products were obtained.

*Example V*

The procedure of Example I was followed, substituting nitric oxide for sulfur in a ratio of approximately 0.37 mole of nitric oxide per mole of nitric acid. The nitric oxide was liquefied, added to the reaction mixture in the liquid form, and the reaction vessel immediately sealed. The yield of nitrated products was approximately 40% of the theoretical yield. In an identical experiment in the absence of nitric oxide, no nitrated products were obtained.

*Example VI*

The procedure of Example I was followed, substituting methyl alcohol for sulfur in a ratio of 0.07 mole of methyl alcohol per mole of nitric acid. The yield of nitrated paraffins was approximately 52% of the theoretical yield. In an identical experiment in the absence of methyl alcohol, no nitrated products were obtained.

*Example VII*

The procedure of Example I was followed, substituting acetone for sulfur in a ratio of 0.08 mole of acetone per mole of nitric acid. The yield of nitrated hydrocarbons was approximately 33% of the theoretical yield. In an identical experiment in the absence of acetone, no nitrated products were obtained.

*Example VIII*

The procedure of Example I was followed, substituting 2-nitroheptane for sulfur in a ratio of 0.02 mole of 2-nitroheptane per mole of nitric acid. The yield of nitrated products was approximately 43% of the theoretical yield. In an identical experiment in the absence of 2-nitroheptane, no nitrated products were obtained.

*Example IX*

The procedure of Example I was followed, substituting butyl mercaptan for sulfur in a ratio of approximately 0.05 mole of butyl mercaptan per mole of nitric acid. The yield of nitrated products was approximately 36% of the theoretical yield. In an identical experiment in the absence of butyl mercaptan, no nitrated products were obtained.

It is to be understood, of course, that the above examples are merely illustrative and do not limit the scope of my invention. My invention is generally applicable to the liquid phase nitration of hydrocarbons containing saturated aliphatic groups, and is not limited to any particular nitration procedure so long as a catalyst of the class described above is provided in the reaction mixture. Compounds other than those employed in the above examples can, of course, be utilized as catalysts, and the procedures of the examples may be modified in numerous respects. In general, it may be said that the use of any equivalents or modifications of procedure which would naturally occur to those skilled in the art is included in the scope of my invention.

My invention now having been described, what I claim is:

1. In a process for the liquid phase nitration of a saturated aliphatic hydrocarbon by means of nitric acid, the step which comprises effecting the reaction at a temperature of between 125° C. and 150° C., by means of an added catalyst for the reaction consisting of sulfur.

2. In a process for the liquid phase nitration of a saturated aliphatic hydrocarbon by means of nitric acid, the step which comprises effecting the reaction at a temperature of between 125° C. and 150° C., by means of an added catalyst for the reaction consisting of carbon.

3. In a process for the liquid phase nitration of a saturated aliphatic hydrocarbon by means of nitric acid, the step which comprises effecting the reaction at a temperature of between 125° C. and 150° C., by means of an initially added catalyst for the reaction consisting of a nitrohydrocarbon.

4. In a process for the liquid phase nitration of a saturated aliphatic hydrocarbon by means of nitric acid, the step which comprises effecting the reaction at a temperature of between 125° C. and 150° C., by means of an initially added catalyst for the reaction consisting of a nitration product of said saturated aliphatic hydrocarbon.

5. In a process for the liquid phase nitration of a saturated aliphatic hydrocarbon by means of nitric acid, the step which comprises effecting the reaction at a temperature of between 125° C. and 150° C., by means of a catalyst for the reaction comprising a reducing agent which will effect more rapid reduction of nitric acid in the liquid phase at 125° C.—150° C. than is effected by the aliphatic hydrocarbon to be nitrated.

6. In a cyclic process for the liquid phase nitration of a saturated aliphatic hydrocarbon by means of nitric acid, the steps which comprise providing in the reaction mixture a molecular excess of saturated aliphatic hydrocarbons over nitric acid, effecting reaction between said hydrocarbons and nitric acid at a temperature of between 125° C. and 150° C., by means of a catalyst for the reaction comprising a reducing agent which will effect more rapid reduction of nitric acid in the liquid phase at 125° C.—150° C. than is effected by the aliphatic hydrocarbon to be nitrated, separating the bulk of the nitrated hydrocarbons from the unreacted hydrocarbons in the reaction product, and re-cycling unreacted hydrocarbons containing at least traces of nitrated hydrocarbons.

MURRAY SENKUS.